July 4, 1933.  H. HUEBER  1,917,194
HORN SYSTEM
Filed April 5, 1932  2 Sheets-Sheet 2
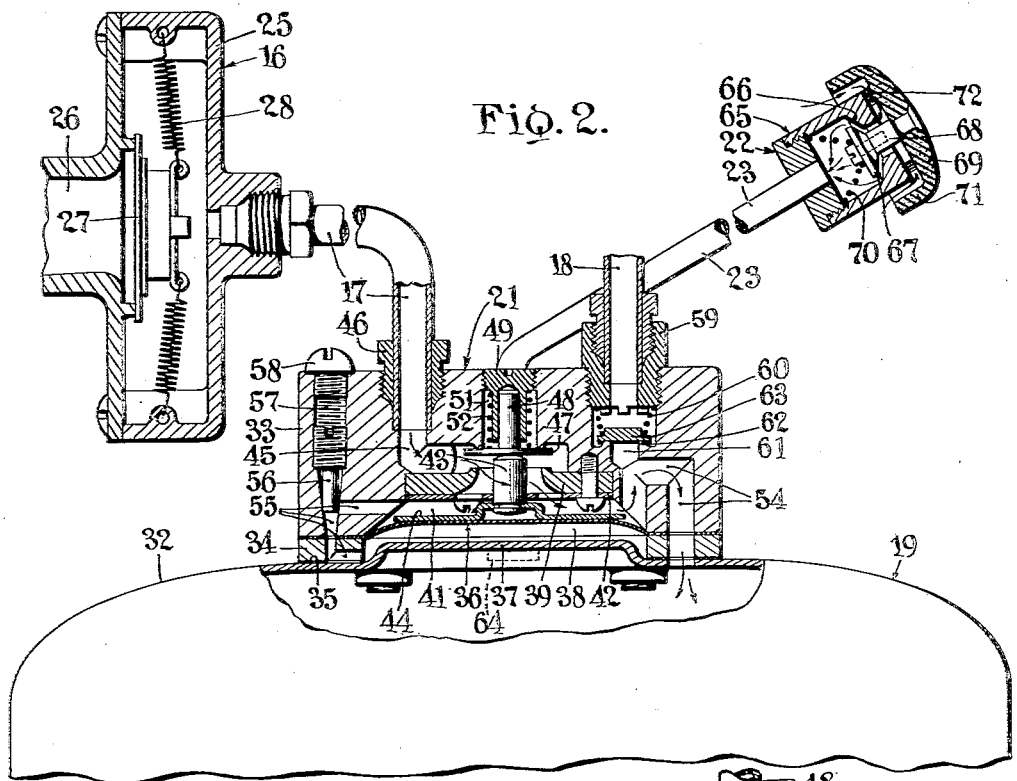
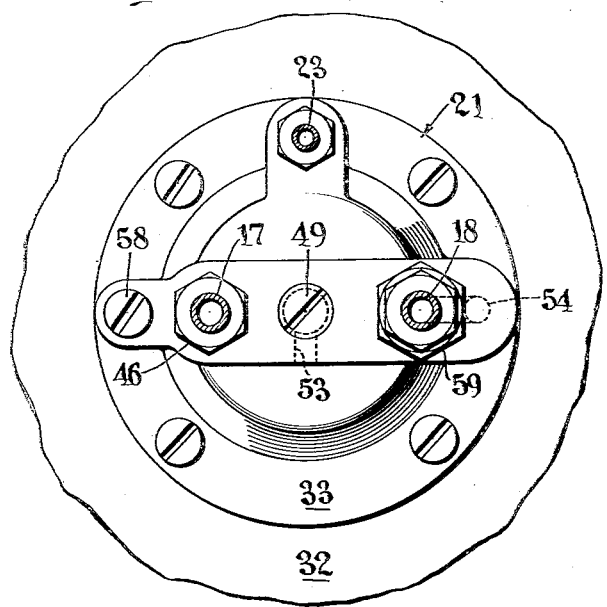
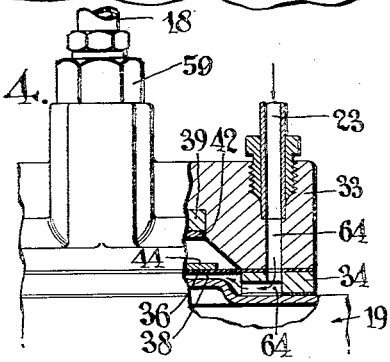
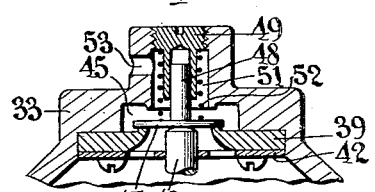
INVENTOR
Henry Hueber,
BY
Bean & Brooks. ATTORNEYS Patented July 4, 1933

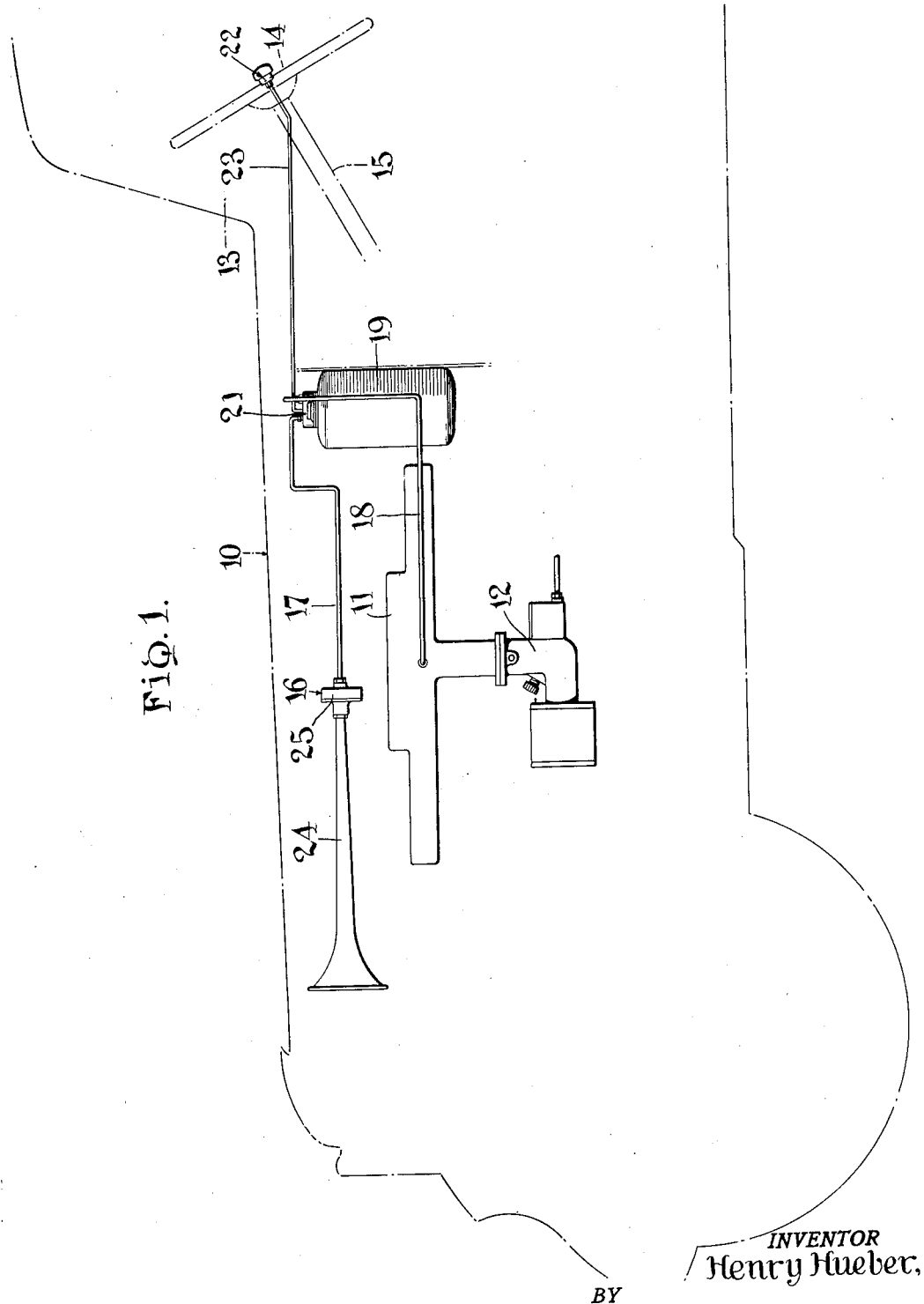

1,917,194

UNITED STATES PATENT OFFICE

HENRY HUEBER, OF BUFFALO, NEW YORK, ASSIGNOR TO TRICO PRODUCTS CORPORATION, OF BUFFALO, NEW YORK

HORN SYSTEM

Application filed April 5, 1932. Serial No. 603,429.

My invention relates to horns and particularly to horns operable by fluid pressure and adapted to be used on automobiles, boats, and like vehicles for emitting warning signals.

Heretofore, it has been customary to control such fluid pressure horns by electrical means. For example, in some systems, an electrically operable fluid valve has been placed in the fluid conduit between the horn and the fluid pressure generating means, and a control switch, disposed in the operator's compartment of the vehicle and accessible to the operator, has been arranged in electric circuit with the valve, whereby the operator could open or close the fluid conduit at will, to thereby effect operation or discontinuance of operation of the horn.

The present invention comprehends a simplification of such system by eliminating the electrical mechanism, thereby precluding the possible short circuiting of wires, failure of the source of electrical energy, overloading of the electrical systems of the vehicles, and other possible difficulties inherent in electrical apparatus, as well as eliminating the cost of manufacture, installation, and servicing of such electrical apparatus.

According to my invention, the system includes a horn; a source of operating fluid pressure connected to the horn; valve means in the connection between the horn and source for selectively causing the operation or discontinuance of operation of the horn; and fluid pressure means controllable by the vehicle operator, and operating by fluid pressure generated at the source, to govern the action of the valve means. The entire horn system, being operable by fluid under pressure, is of simple, durable and inexpensive construction and is dependable and consistent in operation.

The invention also comprehends improvements in the fluid pressure control means whereby a single conduit, extended to the driver's compartment, may be opened or closed to the atmosphere by the operator to control the operation of the horn; and further comprehends means whereby the control apparatus is quickly responsive to cause the horn to sound or cease sounding almost simultaneously with the exercise of control by the operator.

These and other objects and advantages, including those inherent in the arrangements, combinations and structures of the component parts of the apparatus, will become apparent from the following description of the typical embodiment of the invention illustrated in the accompanying drawings, wherein:

Fig. 1 is a diagrammatic view showing a horn system of the present invention applied to an automobile;

Fig. 2 is a vertical section taken through the horn, valve unit and control means shown in Fig. 1;

Fig. 3 is a plan view of the valve unit; and

Figs. 4 and 5 are fragmentary vertical sectional views taken through the valve unit.

As shown in Fig. 1, the motor vehicle 10 has a fuel intake 11, leading from the carburetor 12 to the engine cylinders, and a driver's or control compartment 13 containing a steering wheel and column, 14 and 15 respectively.

A fluid pressure horn 16, operable by the differential pressures of the atmosphere and the engine intake, is connected to the intake 11 by fluid conduits 17 and 18. Interposed between the latter are a suction reservoir 19 and a valve unit 21 for controlling passage of fluid between the horn and intake. The valve unit is controlled by a manually operable valve 22 at one end of a control line 23. The latter extends from the valve unit 21 into the driver's compartment, the valve 22 being disposed within convenient reach of the operator, preferably on the steering column 15 or wheel 14. Upon operation of the control valve 22, the valve unit 21 will open the passage through conduits 18, 17, between the intake 11 and the horn 16, or between the suction reservoir 19 and the horn, to cause the latter to sound, in a manner to be more fully described hereinafter.

The horn 16, of any suitable type operable by differential fluid pressures, is shown as comprising a trumpet 24 and a sound box or casing 25 secured to the inner end thereof. The sound box has a passage 26, a continuation of the passage through the trumpet, normally closed by a valve 27 supported in passage closing position by a plurality of springs 28 anchored to the walls of the sound box. Conduit 17 is connected by a fitting 29 to the sound box and communicates with the interior thereof through a fluid opening 31 in one wall thereof.

When fluid is withdrawn through conduit 17, a condition of less-than-atmospheric pressure will prevail in the sound box, whereby atmospheric air, effective against valve 27 through the trumpet 24 and passage 26, will open valve 27 against the resistance of springs 28. Atmospheric air will enter the interior of casing 26 until the pressure therein approaches atmospheric pressure sufficiently to allow the springs 28 to again seat the valve 27. In this manner, the passage of fluid through the horn trumpet will be interrupted recurrently at high frequencies, causing sound waves or pulsations to be emitted from the horn.

The valve unit 21, depicted in the drawings as mounted upon the upper wall 32 of suction reservoir 19, includes upper and lower casing sections 33 and 34, a gasket 35 being disposed between wall 32 and casing section 34, and a flexible diaphragm piston 36 being between the sections 33 and 34. As shown in Fig. 2, a central portion 37 of reservoir wall 32 is extended upwardly to reduce the capacity of the chamber 38 within the casing beneath piston 36. A valve seating member 39 is fitted in a recess in casing section 33 at the upper end of a chamber 41 between casing section 33 and the piston 36. At the lower face of the member 39 is a perforated guide plate 42 for guiding a piston rod 43 which is secured to the piston by a backing plate 44.

Formed in the upper casing section is a fluid passage 45 communicating with the conduit 17, the latter being secured to the casing by a conventional fitting 46, and communicating with chamber 41 through the opening in the valve seat 39 and the openings in guide plate 42. This communication is normally closed by a valve 47 closing against seat 39. The valve has a stem 48 guided in the bore of a plug 49 secured to the casing. Space 51 is provided between the plug and the casing walls for receiving a coil spring 52 which normally urges the valve 47 against seat 39. A port 53 in casing section 33 admits atmospheric air through the space 51 into passage 45 when the valve 47 is against seat 39. When the valve is raised, as shown in Fig. 3, it seats against casing 33 to close communication between port 53 and passage 45.

Extending from the reservoir 19 into the chamber 41 is a passage 54 formed through the wall 32 of the reservoir and the walls of the casing sections 34 and 33. A bleed passage 55 through the casing section walls connects chambers 38 and 41. The passage 55 is adjustably restricted by a plug 56 screw threaded into an opening 57 in the upper section 37. Normally closing the opening 57 is a screw 58 which may be removed to render the plug 56 accessible for adjustment.

Conduit 18 is connected to the casing section 33 by a sleeve fitting 59 and communicates with passage 54 through a passage 61. A valve seat 62, formed about the walls of the latter passage, is normally closed by check valve 63 by the action of a spring 60 which bears against the check valve and against sleeve 59. The atmospheric or control conduit 23 communicates with a passage 64 extending through the casing sections into chamber 38. The control means 22 includes a casing 65 connected to conduit 23, one wall 66 of the casing composing an annular valve seat. A valve 67 in the casing has secured thereto a stem 68 extending through the bore of the seat 66, and is normally pressed against the seat by a spring 70. Secured to the outer end of the stem 68 is a button 69 having a peripheral flange 71 extending over the cup 65. Protuberances 72 on the inner face of the button serve to space the casing 65 from the button when the latter is depressed to provide an air passage at times when the valve 67 is open.

When the device is inoperative, with the vehicle operating and valve 47 closed against seat 39 by spring 51, as shown in Fig. 5, suction in the engine intake will withdraw fluid from chamber 38, through bleed passage 55, from chamber 41 and reservoir 19 through passages 54 and 61 and conduit 18 to the intake, and a condition of less-than-atmospheric pressure will prevail in the reservoir 19 and against both faces of piston 36. As the valve 67 is closed, air will also be withdrawn from conduit 23 via chamber 41. At the same time atmospheric pressure will prevail within the horn casing, conduit 17 and passage 45, since the valve uncovers the atmospheric vented space 51.

To sound the horn, the button 69 may be depressed, allowing atmospheric air to flow past valve 67 and enter the chamber 38 and move the piston and stem 43 upwardly, moving the valve 47 to the position shown in Fig. 2 against the resistance of spring 51. Because of the restricted capacity of bleed passage 55 for fluid passage, atmospheric pressure will not become effective in chamber 41. Upon such movement of valve 47 fluid will be drawn from the horn interior through conduit 17, passage 45, chamber 41, passage 61 and conduit 18 into the engine intake 11. The resulting reduction in fluid pressure in the horn interior will cause the horn to sound in the manner hereinbefore described. In the event that the source of suction, 11, should temporarily fail, as when the engine is being accelerated, the check valve 63 will close and the reservoir 19 will constitute the source of suction.

Upon release of the control button 69, the spring 70 will immediately close valve 67, whereupon the atmospheric fluid in conduit 23 and chamber 38 will be bled through passage 55 until the pressure in the chamber is sufficiently equalized with that in chamber 41 as to allow atmospheric pressure and spring 51 to close valve 47 against seat 39. Operation of the horn will immediately cease since atmospheric pressure will prevail in the horn, the conduit 17, and passage 45, entering therein via port 53 and space 51.

It will be understood that the structure herein described and illustrated is merely illustrative of one embodiment of the inventive principles involved and that these principles may be utilized in devices having other structural characteristics and arrangements, within the purview of this invention.

What is claimed is:

1. In a fluid pressure horn system for a motor vehicle having an internal combustion engine with a fluid intake, a horn operable by suction, a suction storage tank, a check valved passage between said intake and the tank for allowing fluid to pass only from the tank into the intake, a fluid passage between the tank and the horn, valve means in said last mentioned passage comprising a valve for controlling fluid movement through the passage, a piston for actuating the valve, means whereby one side of said piston is normally subjected to the pressure effective in said tank, and means including an air inlet valve for applying atmospheric pressure to the other side of the piston, whereby upon opening of said air inlet control valve said piston will move to open the valve of said valve means to effect actuation of the horn.

2. In a fluid pressure horn system for a motor vehicle having an internal combustion engine with a fluid intake, a horn operable by suction applied thereto, a suction storage tank, a check valved passage between said intake and the tank for allowing fluid to pass only from the tank into the intake, a fluid passage between the tank and the horn, valve means in said last mentioned passage comprising a valve for controlling fluid movement through the passage and a piston for actuating the valve, means whereby one side of said piston is normally subjected to the pressure effective in said tank, means including an air inlet valve for applying atmospheric pressure to the other side of the piston, whereby upon opening of said air inlet control valve said piston will move to open the valve of said valve means to effect actuation of the horn, and a bleed opening between said sides of the piston for slowly equalizing the pressures effective thereagainst.

3. In a fluid pressure horn system, a horn operable by suction applied thereto, a source of suction, a passage between the source of suction and the horn, a valve for said passage, a piston for actuating the valve, means normally subjecting one side of said piston to the fluid pressure of said source, means including an air inlet control valve for applying atmospheric pressure to the other side of the piston to urge the piston to valve opening position to effect operation of the horn, and a bleed opening between said sides of the piston for slowly equalizing the pressures effective thereagainst.

4. In a fluid pressure horn system, a horn operable by suction applied thereto, a source of suction, a passage between the source of suction and the horn, a valve normally closing said passage, a piston for actuating the valve, means normally subjecting one side of said piston to the pressures of said source, and means including an air inlet control valve for applying atmospheric pressure to the other side of the piston to urge the piston to valve opening position to effect operation of the horn.

5. In a fluid pressure horn system for a vehicle having a driver's or control compartment, a horn operable by suction applied thereto, a source of suction, a passage connecting the source and the horn, a valve for said passage, a piston for actuating the valve, means normally conducting pressure of the source against one side of the piston, a conduit for applying atmospheric pressure to the other side of the piston to move the valve to open position and thereby operate the horn, said conduit extending to said compartment and there terminating in a normally closed air inlet valve.

6. In a fluid pressure horn system for a vehicle having a driver's or control compartment containing a hollow steering column, a horn operable by suction applied thereto, a source of suction, a passage connecting the source and horn, a valve for said passage, a piston for actuating the valve, means applying suction against one side of the piston, a conduit for conducting atmospheric pressure to the other side of the piston to move the valve to open position and thereby operate the horn, said conduit extending through said hollow steering column and terminating in a normally closed air inlet valve at the upper end of said column.

7. A horn fluid passage control adapted to be disposed in the driver's compartment of a vehicle, comprising a casing communicating with the fluid passage and having an opening in one end thereof, a valve in said casing and having a stem extending through the opening, spring means for normally retaining the valve seated against the opening, an actuating button secured to the stem and normally spaced from said end of the casing, said button having a peripheral flange extending over the side walls of the casing, there being space between the flange and side walls for allowing fluid to pass therebetween when said button is pressed to unseat the valve.

8. In a fluid pressure horn system, a horn operable by suction applied thereto, a source of suction and a passage connecting it to the horn, an atmospheric opening and a valve seat in said passage, a valve movable to close against the opening or the seat to open the passage or to close the passage and admit atmosphere to the portion of the passage between the horn and the valve, and means for actuating said valve.

9. In a fluid pressure horn system, a horn operable by differential fluid pressures and having an atmospheric port, a passage connecting the horn to a source of pressure different than atmospheric, said passage having an atmospheric opening and a valve seat between the opening and said source, a valve movable to either a position closing said opening or closing against said valve seat, and means for actuating the valve, whereby atmospheric pressure or the pressure of said source may be applied to the horn through the passage.

10. In a fluid pressure horn system, a horn operable by differential fluid pressures and having an atmospheric port, a passage connecting the horn to a source of pressure different than atmospheric, said passage having an atmospheric opening and a valve seat between the opening and said source, a valve movable to either a position closing said opening or closing against said valve seat, an element for moving the valve and operable by differential fluid pressures, and means including a manually operable valve for applying different fluid pressure to one side of the element than to the other side thereof.

11. In a fluid pressure horn system, a horn operable by differential fluid pressures and having an atmospheric port, a passage connecting the horn to a source of pressure different than atmospheric, said passage having an atmospheric opening and a valve seat between the opening and said source, a valve movable to either a position closing said opening or closing against said valve seat, a piston for moving said valve, means for applying the fluid pressure of said source against one side of the piston, and means including a normally closed atmospheric inlet valve for applying atmospheric pressure to the opposite side of the piston.

12. In a fluid pressure horn system, a horn operable by differential fluid pressure and having an atmospheric port, a passage connecting the horn to a source of pressure different than atmospheric, said passage having an atmospheric opening and a valve seat between the opening and said source, a valve movable to either a position closing said opening or closing against said valve seat, a piston for moving said valve, means for applying the fluid pressure of said source against one side of the piston, means including a normally closed atmospheric inlet valve for applying atmospheric pressure to the opposite side of the piston, and a bleed opening between said sides of the piston for slowly equalizing the pressures effective thereagainst.

13. In a fluid pressure horn system, a horn operable by suction applied thereto, a source of suction, a passage between the source of suction and the horn, a valve adapted to close the passage, a spring for urging and normally returning the valve in closing position, a piston for moving the valve, means normally subjecting one side of said piston to the pressure of said source, and means including an atmospheric inlet valve for applying atmospheric pressure to the other side of the piston to effect movement of the valve to open position against the urge of said spring.

14. In a fluid pressure horn system, a horn operable by suction applied thereto, a source of suction and a passage connecting it to the horn, an atmospheric opening and a valve seat in said passage, a valve movable to close against the opening or against the seat to respectively open the passage and close the atmospheric opening or to close the passage and admit atmospheric pressure to the portion of the passage between the horn and the valve, a spring for urging the valve against said seat, and fluid pressure means for moving the valve away from said seat.

15. In a fluid pressure horn system, a horn operable by fluid pressure, a source of operating fluid pressure for the horn and a passage connecting the source and horn, a valve seat and a valve in said passage, a piston adjacent to the valve, means for applying differential fluid pressures to the opposite sides of the piston to move the valve away from said seat to effect operation of said horn, and a spring for urging said valve toward the seat and for retaining said valve against the seat when said differential fluid pressures are not effective against the piston.

HENRY HUEBER.